United States Patent
Ahn

(10) Patent No.: US 9,564,615 B2
(45) Date of Patent: Feb. 7, 2017

(54) POUCH TYPE BATTERY AND METHOD OF USING THE SAME

(75) Inventor: Chang-Bum Ahn, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 977 days.

(21) Appl. No.: 13/485,549

(22) Filed: May 31, 2012

(65) Prior Publication Data

US 2013/0017437 A1    Jan. 17, 2013

(30) Foreign Application Priority Data

Jul. 15, 2011    (KR) .................. 10-2011-0070660

(51) Int. Cl.
*H01M 2/02* (2006.01)
*H01M 2/36* (2006.01)

(52) U.S. Cl.
CPC .......... *H01M 2/0212* (2013.01); *H01M 2/361* (2013.01); *H01M 2/365* (2013.01); *Y10T 29/4911* (2015.01)

(58) Field of Classification Search
CPC .... H01M 2/0212; H01M 2/361; H01M 2/365; H01M 2/02
See application file for complete search history.

(56) References Cited

U.S. PATENT DOCUMENTS

| | | | |
|---|---|---|---|
| 7,199,550 B2 | 4/2007 | Tsutsui et al. | |
| 2008/0070101 A1* | 3/2008 | Barrella | H01M 2/0207 429/72 |
| 2010/0112420 A1* | 5/2010 | Back | 429/90 |
| 2011/0300437 A1* | 12/2011 | Yi | 429/179 |

FOREIGN PATENT DOCUMENTS

| | | | | |
|---|---|---|---|---|
| JP | 2002-117829 | | 4/2002 | |
| KR | 10-0531450 | | 11/2005 | |
| KR | 10-0779002 | | 11/2007 | |
| KR | 1020050128995 | * | 11/2007 | .............. H01M 2/36 |
| KR | 10-2012-0076878 | | 7/2012 | |
| KR | 1020120076878 | * | 7/2012 | .............. H01M 2/36 |

OTHER PUBLICATIONS

Office Action dated Aug. 27, 2012 for corresponding KR Application No. 10-2011-0070660.

* cited by examiner

*Primary Examiner* — Barbara Gilliam
*Assistant Examiner* — Angela Martin
(74) *Attorney, Agent, or Firm* — Knobbe Martens Olson & Bear LLP

(57) ABSTRACT

A pouch type battery and a method of using the pouch type battery that includes an electrode assembly that includes a first electrode plate, a second electrode plate, and a separator interposed between the first and second electrode plates, and a pouch case that includes the electrode assembly and an electrolyte, wherein the pouch case includes an additional electrolyte inlet that protrudes from the pouch case.

10 Claims, 6 Drawing Sheets

POUCH TYPE BATTERY AND METHOD OF USING THE SAME

RELATED APPLICATIONS

This application claims the benefit of Korean Patent Application No. 10-2011-0070660, filed on Jul. 15, 2011, in the Korean Intellectual Property Office, the disclosure of which is incorporated herein in its entirety by reference.

BACKGROUND

1. Field

One or more embodiments of the present invention relate to pouch type batteries and methods of using the pouch type batteries.

2. Description of the Related Art

Due to their advantages, secondary batteries are applied to various technical fields across a variety of industries as energy sources of various mobile electronic devices such as digital cameras, cellular phones, or notebook computers. Also, the secondary batteries are used as energy sources of hybrid electric cars which are proposed as a solution to environmental contamination caused by gasoline engines and diesel internal combustion engines. The secondary batteries are also used in energy storage systems for industries and households. Accordingly, research into stably using the secondary batteries for a long time has been actively conducted.

SUMMARY

One or more embodiments of the present invention include pouch type batteries that may continuously supply an electrolyte and a method of using the pouch type batteries.

Additional aspects will be set forth in part in the description which follows and, in part, will be apparent from the description, or may be learned by practice of the presented embodiments.

According to one or more embodiments of the present invention, there is provided a pouch type battery including: an electrode assembly that includes a first electrode, a second electrode, and a separator interposed between the first and second electrodes; and a pouch case that includes the electrode assembly and an electrolyte, wherein the pouch case includes an additional electrolyte inlet that protrudes from the pouch case.

The additional electrolyte inlet may protrude from an upper surface of the pouch case.

The electrode assembly may include an positive electrode tab that is electrically connected to an positive electrode plate and protrudes from the pouch case, and a negative electrode tab that is electrically connected to a negative electrode plate and protrudes from the pouch case, wherein the additional electrolyte inlet is disposed in a same direction as the direction of the positive electrode tab and the negative electrode tab.

The additional electrolyte inlet may be formed between the positive electrode tab and the negative electrode tab.

The additional electrolyte inlet may be sealed by a sealing portion formed along an outer surface of the additional electrolyte inlet.

An inner space of the additional electrolyte inlet may be spatially connected to an inner space of the pouch case.

An edge of the additional electrolyte inlet may be able to be cut, and, after cutting the edge, the cut-edge of the additional electrolyte inlet may be re-sealed by a sealing portion that is formed along the edge of the additional electrolyte inlet.

The additional electrolyte inlet may have a length in a range from about 3 cm to about 7 cm.

The additional electrolyte inlet may be formed on a terrace portion formed on a side of the pouch case.

The pouch type battery may be used for medium and large energy storage battery packs.

According to one or more embodiments of the present invention, there is provided a method of using a pouch type battery, the method including: preparing a pouch type battery comprising an electrode assembly that includes a first electrode, a second electrode, and a separator interposed between the first and second electrodes, a pouch case that includes the electrode assembly and an electrolyte, wherein the pouch case includes an additional electrolyte inlet that protrudes from the pouch case; cutting off an edge portion of the additional electrolyte inlet while using the pouch type battery; adding the electrolyte through the cut-off edge of the additional electrolyte inlet; and sealing the cut-off edge of the additional electrolyte inlet.

The additional electrolyte inlet may be formed by protruding from the pouch case.

The cutting off of the edge portion of the additional electrolyte inlet, adding the electrolyte, and sealing the cut-off edge of the additional electrolyte inlet are repeatedly performed.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereafter, the present invention will be described more fully with reference to the accompanying drawings, in which exemplary embodiments of the present invention are shown. This invention may, however, be embodied in many different forms and should not construed as limited to the exemplary embodiments set forth herein. Rather, these embodiments are provided so that this disclosure will be thorough and complete, and will fully convey the scope of the invention to those of ordinary skill in the art. The scope of the present invention is defined not by the detailed description but by the appended claims. The terminology used herein is for the purpose of describing particular embodiments only and is not intended to be limiting of the invention. The singular forms include the plural forms unless the context clearly indicates otherwise. The terms "comprise" and/or "comprising" when used in this specification, specify the presence of constituent elements, steps, operations, and/or components, but do not preclude the presence or addition of one or more other constituent elements, steps, operations, and/or components thereof. Although the terms first, second, etc., may be used herein to describe various elements, these elements should not be limited by these terms. These terms are only used to distinguish one element from another element.

Figure 1:
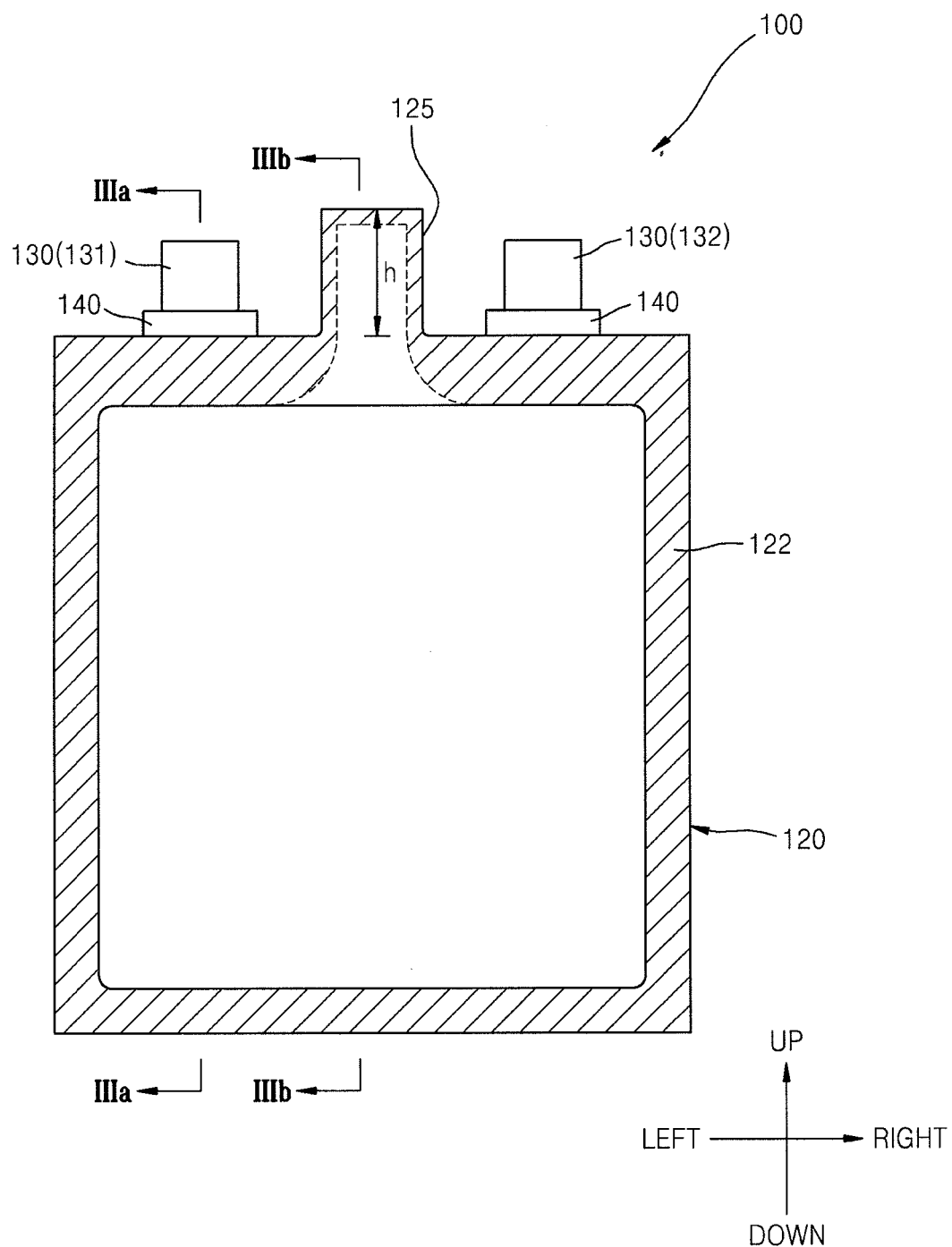
FIG. 1 is a schematic front view of a pouch type battery according to an embodiment of the present invention.
Figure 2:
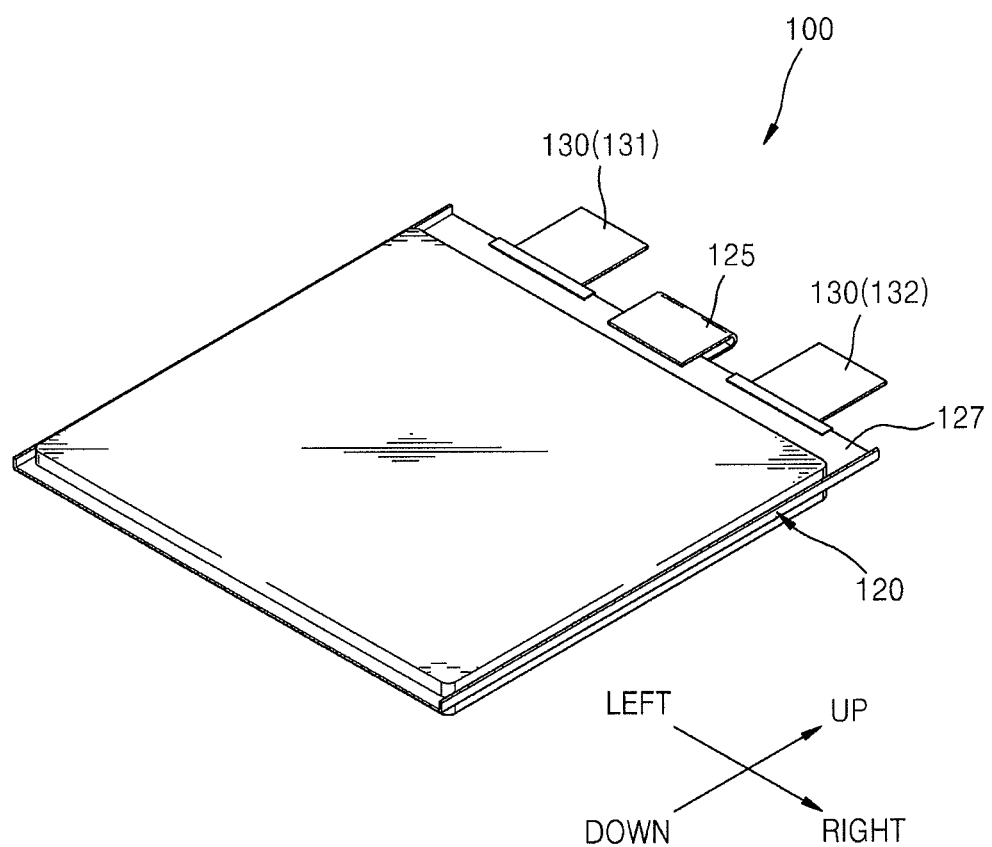
FIG. 2 is a schematic perspective view of a state of a pouch type battery according to an embodiment of the present invention.
Figure 3A:
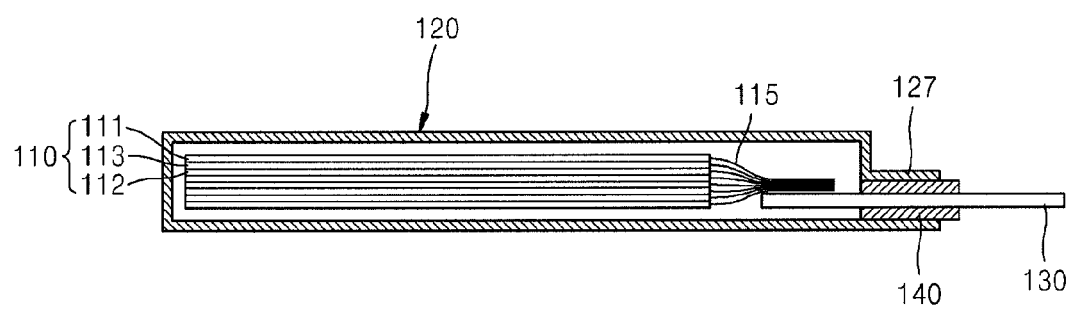
FIG. 3A is a cross-sectional view taken along a line IIIa-IIIa of FIG. 1.
Figure 3B:
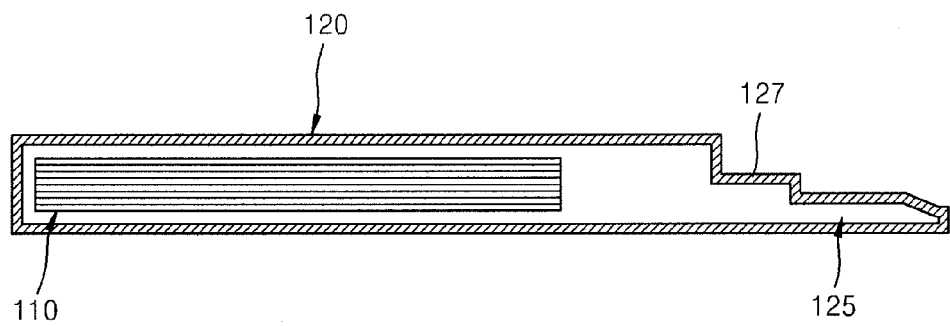
FIG. 3B is a cross-sectional view taken along a line of FIG. 1.

FIG. 1 is a schematic cross-sectional view of a pouch type battery 100 according to an embodiment of the present invention. FIG. 2 is a schematic perspective view of a state of a pouch type battery according to an embodiment of the present invention. FIG. 3A is a cross-sectional view taken along a line IIIa-IIIa of FIG. 1, and FIG. 3B is a cross-sectional view taken along a line IIIb-IIIb of FIG. 1.

Referring to FIGS. 1, 2, and 3A, the pouch type battery 100 according to an embodiment of the present invention may include an electrode assembly 110, a lead tab 130, and a pouch case 120 having an additional electrolyte inlet 125. The pouch type battery 100 according to an embodiment of the present invention may be a rechargeable secondary battery, for example, may be a lithium-ion battery.

The electrode assembly 110 (refer to FIG. 3A) is accommodated within the pouch case 120. The electrode assembly 110 includes a positive electrode plate 111, a negative electrode plate 112, and a separator 113 interposed between the positive electrode plate 111 and the negative electrode plate 112. The electrode assembly 110 may be a stacking type electrode assembly in which the positive electrode plate 111, the separator 113, and the negative electrode plate 112 are sequentially stacked. In order to realize a high output and a large capacity pouch type battery 100, a plurality of positive electrode plates 111, separators 113, and negative electrode plates 112 may be stacked on top of each other.

The positive electrode plate 111 may be formed by coating a positive electrode active material on a surface of a positive electrode current collector formed of a material such as aluminum. The positive electrode active material may be a lithium containing transition metal such as $LiCoO_2$, $LiNiO_2$, $LiMnO_2$, $LiMnO_4$ or a lithium chalcogenide compound.

The negative electrode plate 112 may be formed by coating a negative electrode active material on a surface of a negative electrode current collector formed of a material such as nickel. The negative electrode active material may be a carbon material, for example, crystalline carbon, amorphous carbon, carbon composite, and carbon fiber, a lithium metal, or a lithium alloy.

Electrode tabs 115 respectively may be electrically connected to the positive electrode plate 111 and the negative electrode plate 112. The electrode tabs 115 respectively connected to the stacked positive electrode plate 111 and the negative electrode plate 112 may overlap with each other and the electrode tabs 115 concentrated with respect to each other are electrically connected to lead tabs 130. For example, the electrode tabs 115 and the lead tabs 130 may be connected by using an ultrasonic fusion method. One of the lead tabs 130 is a positive lead tab 131 and the other is a negative lead tab 132.

The separator 113 may include a porous polypropylene (PP) material or a porous polyethylene (PE) material so that lithium ions may easily move between the positive electrode plate 111 and the negative electrode plate 112.

The lead tabs 130 may extend outwards from an upper surface of the pouch case 120, and each of the lead tabs 130 may be surrounded by a tab tape 140 to increase a sealing performance of the pouch case 120 and to electrically insulate the lead tabs 130 from the pouch case 120.

In the current embodiment, the stack type electrode assembly 110 is described. However, the electrode assembly 110 according to the current embodiment is not limited thereto. For example, the electrode assembly 110 may be a wound type electrode assembly in which a positive electrode plate, a separator, and a negative electrode plate are wound in a jelly-roll type electrode assembly after the positive electrode plate, the separator, and the negative electrode plate are stacked.

The pouch case 120 is a pouch type, and includes an inner space for accommodating the electrode assembly 110 and an electrolyte. For example, the pouch case 120 may include a metal thin-film layer, but a surface of the pouch case 120 exposed to the outside and an inner surface of the pouch case 120 exposed to the electrode assembly 110 are insulated. For example, the pouch case 120 may include a metal such as aluminum or stainless steel.

The pouch case 120 includes an additional electrolyte inlet 125 protruding from a side of the pouch case 120. The additional electrolyte inlet 125 is formed between the positive lead tab 131 and the negative lead tab 132. The additional electrolyte inlet 125 extends by a predetermined length h from the upper surface of the pouch case 120. The length h of the additional electrolyte inlet 125 may be determined in consideration of service life and capacity of the pouch type battery 100, and may be in a range from about 3 cm to about 7 cm. As an example, when the pouch type battery 100 having a capacity of approximately 50 A is manufactured, the additional electrolyte inlet 125 may have a length h of approximately 5 cm.

The additional electrolyte inlet 125 may protrude from the upper surface of the pouch case 120. Since the additional electrolyte inlet 125 is located on the upper surface of the pouch case 120, an electrolyte may be supplied by using gravity. Also, because the additional electrolyte inlet 125 is included in the same direction as the direction of the positive lead tab 131 and the negative lead tab 132, an additional space for including the additional electrolyte inlet 125 is unnecessary.

The additional electrolyte inlet 125 may be included in a terrace portion 127 of the pouch case 120. Referring to FIG. 2, the additional electrolyte inlet 125 may be disposed on the terrace portion 127 of the folded state pouch case 120. Although not shown, the additional electrolyte inlet 125 formed on the terrace portion 127 may be fixed by using a fixing member (not shown) such as a clamp. In the current embodiment, the additional electrolyte inlet 125 is depicted as being folded in half. However, the additional electrolyte inlet 125 according to the current embodiment is not limited thereto. For example, the additional electrolyte inlet 125 may be disposed and fixed on the terrace portion 127 in a roll state by rolling the additional electrolyte inlet 125 along the length direction the additional electrolyte inlet 125.

The pouch case 120 may include a sealing portion 122 to prevent the electrolyte from leakage. Since the sealing portion 122 is formed along the outer surface of the pouch case 120, an outer surface of the additional electrolyte inlet 125 is also sealed. Referring to FIGS. 1 and 3B, since outer surfaces, that is, edges of the additional electrolyte inlet 125, are sealed, an inner space of the additional electrolyte inlet 125 is spatially connected to the inner space of the pouch case 120.

Figure 4:
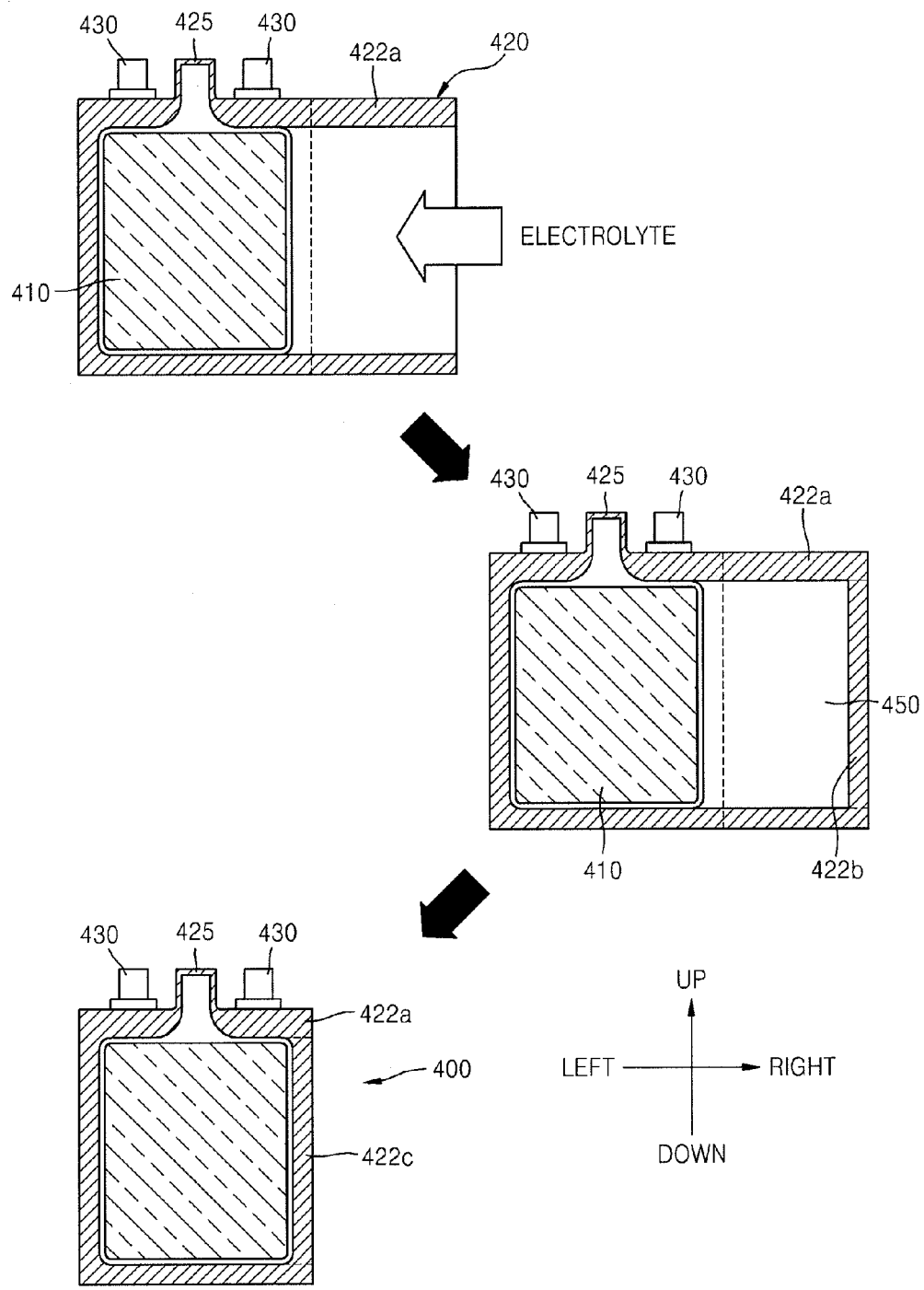
FIG. 4 illustrates a method of manufacturing a pouch type battery according to an embodiment of the present invention.

FIG. 4 illustrates a method of manufacturing a pouch type battery 400 according to an embodiment of the present invention.

Referring to FIG. 4, when the manufacturing of an electrode assembly 410 described with reference to FIG. 3A is finished, the electrode assembly 410 is accommodated in a pouch case 420. Afterwards, the electrode assembly 410 is sealed along an upper side, a left side, and a lower side. A first sealing portion 422a is formed along an outer surface of the pouch case 420. Since the first sealing portion 422a is formed along the three sides of the pouch case 420, a right side of the pouch case 420 is opened.

Next, an electrolyte is supplied to the pouch type battery 400 through the open-side of the pouch case 420, and a temporary sealing portion 422b is formed by sealing the right side of the pouch case 420. Afterwards, an activation process is performed. At this point, a gas generated in this process may be collected in a right space 450 of the pouch case 420.

In order to discharge the gas, the right side of the pouch case 420 is cut-off. Afterwards, a second sealing portion 422c is formed, and thus, the manufacturing of the pouch type battery 400 is completed.

The pouch type battery 400 manufactured by the process described above may be used for medium and large energy storage battery packs that store energy or supply the stored energy to the outside through operations that are performed for a few to a few tens of years. When the pouch type battery 400 is operated for a long period of time, the amount of the electrolyte may be reduced. In this case, the electrolyte may be added by using an additional electrolyte inlet 425. A process of adding the electrolyte will now be described.

Figure 5:
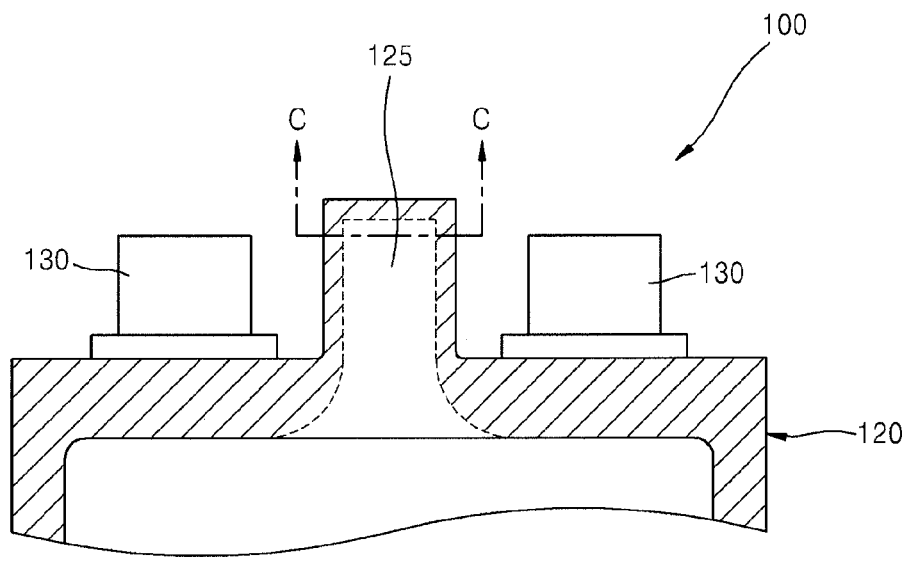
FIGS. 5 through 7 are front views for explaining a process of injecting an electrolyte using an additional electrolyte inlet of a pouch type battery according to an embodiment of the present invention.
Figure 6:
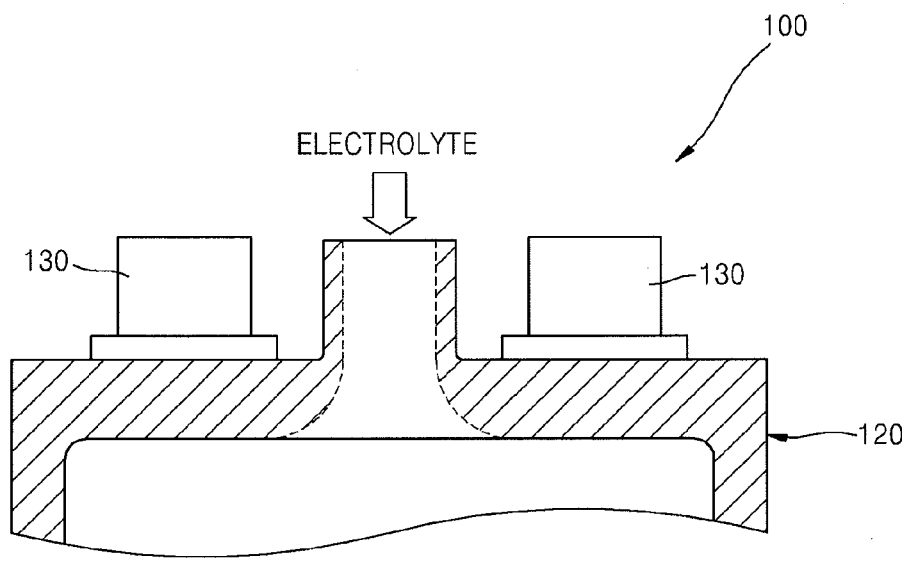
Figure 7:
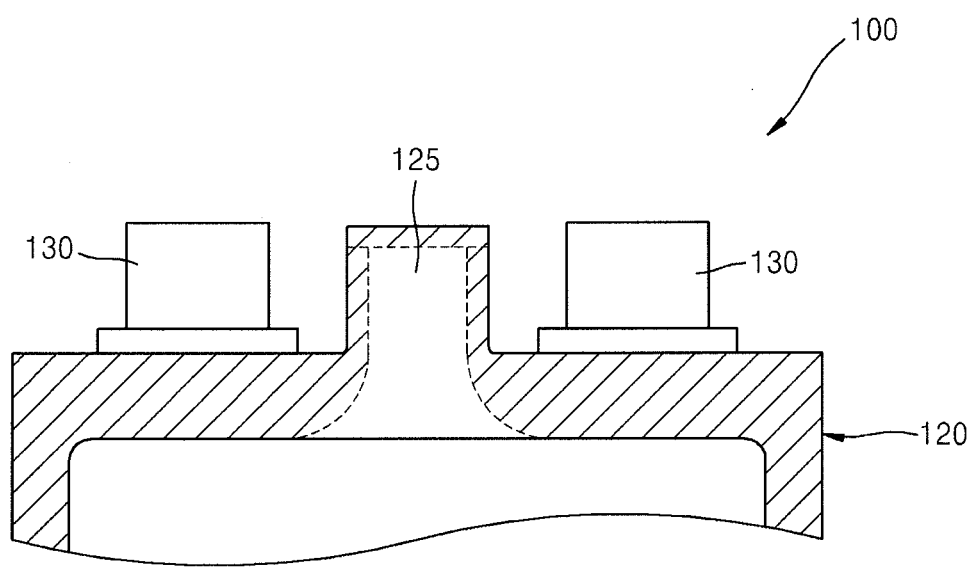

FIGS. 5 through 7 are front views for explaining a process of injecting an electrolyte using an additional electrolyte inlet 125 of the pouch type battery 100 according to an embodiment of the present invention.

FIG. 5 shows an initial state of using the pouch type battery 100. Referring to FIG. 5, when it is necessary to add an electrolyte during the use of the pouch type battery 100, the additional electrolyte inlet 125 is cut along a cutting line C-C. FIG. 6 shows a cut-state of the additional electrolyte inlet 125.

Since an edge portion of the additional electrolyte inlet 125 is cut, the additional electrolyte inlet 125 is in an open-state. The electrolyte is supplied through the open-state additional electrolyte inlet 125. Since the additional electrolyte inlet 125 is provided on an upper surface of the pouch type battery 100, the electrolyte readily moves into the pouch type battery 100 by gravity.

When the addition of the electrolyte is completed, the edge of the opened additional electrolyte inlet 125 is sealed. The sealing may be performed by using a thermal fusion method. FIG. 7 shows a sealing state after the addition of electrolyte is completed.

When FIG. 5 and FIG. 7 are compared, a length of the additional electrolyte inlet 125 is reduced by as much as the cut-off edge portion.

Periodical addition of the electrolyte may be performed by repeatedly performing the above process. The length of the additional electrolyte inlet 125 is reduced whenever the addition of the electrolyte is repeated, and thus, as described above, the length of the additional electrolyte inlet 125 may be determined in consideration of service life, capacity, etc.

According to the embodiments of the present invention may provide pouch type batteries that may be stably operated for a few to a few tens of years by including an additional electrolyte inlet for supplying an electrolyte.

Accordingly, maintenance costs for systems that use the pouch type batteries may be reduced because the systems do not need to replace the old pouch type batteries with new pouch type batteries.

While the present invention has been particularly shown and described with reference to exemplary embodiments thereof, it will be understood by those of ordinary skill in the art that various changes in form and details may be made therein without departing from the spirit and scope of the present invention. Therefore, the scope of the invention may include changes and modifications that belong to the spirit and scope of the present invention.

What is claimed is:

1. A pouch battery comprising:
   an electrode assembly that comprises a first electrode plate, a second electrode plate, and a separator interposed between the first and second electrode plates;
   a first lead tab that is electrically connected to the first electrode plate;
   a second lead tab that is electrically connected to the second electrode plate; and
   a pouch case comprising a first surface and a second surface facing each other with the electrode assembly disposed therebetween, the pouch case defines an inner space accommodating the electrode assembly and an electrolyte and a terrace portion that has an outer edge formed at one edge of the inner space, wherein the first and second lead tabs protrude from the outer edge of the terrace portion, and
   wherein a portion of the first surface extends outward from a side of the pouch case, a portion of the second surface overlaps the portion of the first surface, and outer edges of the portions of the first and second surfaces are sealed each other to provide an electrolyte inlet formed as an integral part of the pouch case.

2. The pouch battery of claim 1, wherein the electrolyte inlet protrudes from an upper portion of the pouch case.

3. The pouch battery of claim 1, wherein the electrolyte inlet is disposed in a same direction as the direction of the first lead tab and the second lead tab.

4. The pouch battery of claim 1, wherein the electrolyte inlet is between the first lead tab and the second lead tab.

5. The pouch battery of claim 1, wherein the electrolyte inlet is sealed by a sealing portion formed along an outer surface of the electrolyte inlet.

6. The pouch battery of claim 5, wherein an inner space of the electrolyte inlet is spatially connected to an inner space of the pouch case.

7. The pouch battery of claim 5, wherein an edge of the electrolyte inlet is able to be cut, and, after cutting the edge, the cut edge of the electrolyte inlet is re-sealed by a sealing portion that is formed along the edge of the electrolyte inlet.

8. The pouch battery of claim 1, wherein the electrolyte inlet has a length in a range from about 3 cm to about 7 cm.

9. The pouch battery of claim 1, wherein the electrolyte inlet is formed on a terrace portion formed on a side of the pouch case.

10. The pouch battery of claim 1, wherein the pouch battery is used for medium and large energy storage battery packs.

* * * * *